July 30, 1940.    J. HOZA    2,209,651
SHANK FOR FOOTWEAR

Filed July 5, 1938

Inventor
John Hoza
By John E. Easthef
attorney

Patented July 30, 1940

2,209,651

UNITED STATES PATENT OFFICE 2,209,651

SHANK FOR FOOTWEAR

John Hoza, Zlin, Czechoslovakia

Application July 5, 1938, Serial No. 217,531
In Czechoslovakia July 19, 1937

9 Claims. (Cl. 12—60)

This invention relates to the manufacture of shank pieces for shoes, boots and like footwear, hereinafter referred to as shoes.

An object of the present invention is to produce rapidly and economically shank pieces which are substantially uniform in shape and the attainment of this and other objects of the present invention will be apparent from the following description which gives by way of example only, one embodiment thereof.

Figure 1:
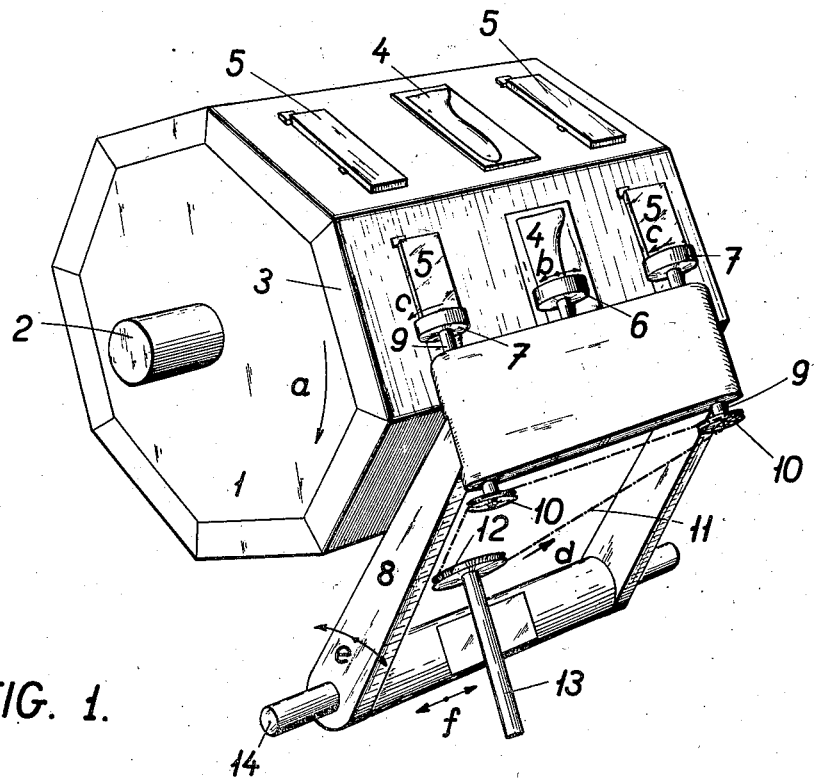
Fig. 1 is a perspective view of a drum, whereon rows of shanks to be fashioned (in the example eight rows) are fastened, and of the fashioning tools, namely the milling cutters, for machining the shanks, the number of the cutters being the same as the number of shanks to be machined in each row.
Figure 2:
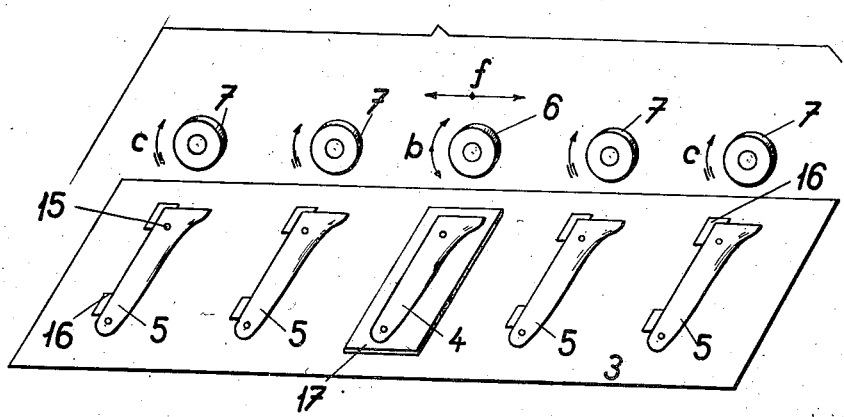
Fig. 2 is a diagram of the arrangement of a row of shanks to be machined, four places of operation being shown, in contrast to Fig. 1, which illustrates two places of operation only.

In a machine frame (not shown) constructed according to the requirements of the machine and of the plant, a body for receiving and fixing the shanks to be machined is mounted on a rotatable shaft 2. In the example shown in Fig. 1 this body comprises a polygonal drum 1. On each side of this drum the same number of fixing means 5 is provided for the machining of the shanks. In alignment with these fixing means a plate 17 is mounted on each wall 3 for the reception of the template or model 4, which has the surface to be profiled on all shanks. The same number of milling cutters 7 is provided as there are clamping positions or shanks to be machined, and opposite the template 4 a guide roller 6, positively rolling down thereon, is provided. The shafts 9 carrying the milling cutters 7 and the guide roller 6 are mounted on the common rockable arm 8, pulleys 10 being provided at the other ends of the shafts 9. The drive is transmitted to said pulleys by a belt 11 from the pulley 12 mounted on the driving shaft 14. The arm 8 is rockable on the shaft 14 in such a manner that it is capable of allowing reciprocating movements of the roller 6 in accordance with the shape of the template, in the direction of the arrows e. The arm 8 is fast on the shaft 14 and is also movable with this shaft in the direction of the arrows f.

The shaft 2 of the drum and the shaft 14 of the rockable arm are mounted in a common frame not shown in the drawing. The reciprocatory movement of the shaft 14 in the longitudinal direction is effected in any known manner.

With the machine just described blanks or previously partly fashioned shanks can be machined on both profiled sides.

The preparation of the partly fashioned shank is effected, for example, by cutting out the profile corresponding to the shank to be made from selected, strong, good quality boards. These profiled pieces are then further cut up to individual semi-finished shanks, their preliminary curvature substantially corresponding to the curvature of the shanks and their thickness corresponding to the maximum thickness of the shanks to be made.

In the known methods the inner and outer shape was obtained on the semi-finished products thus prepared for example by grinding with the aid of glass paper wheels. This was a very laborious operation and the shanks produced corresponded only approximately to the desired shape, so that each shank and accordingly each shoe of the same type was unequal and different.

In the method according to the invention the last operation, that is to say the actual production of the shank which has been prepared, is effected on the machine described above, which enables the manufacture of products which are exactly alike, by entirely automatic operation.

The operation of the machine is as follows:

The material of which the shanks are produced, e. g. wood, is mounted on a plate 3, at the centre of which the template is fastened, in such a manner that at each clamping position a piece of wood previously cut out to the shape of the shank to be made is fixed. Fixing is effected by placing the pieces against the stops 16, which accurately define their position on the plate necessary for their correct machining. Thereupon the pieces are knocked over the points 15 provided for each individual piece. The row of pieces thus prepared is slowly turned, together with the template 4, which in this case is disposed to expose the cavity on the inner surface of the shanks to be made, on to the cutters 7, which accurately machine the pieces 5 in accordance with the template 4 owing to the rolling down of the guide roller 6 on the template. For finishing the product ready for use two operations are necessary, namely (1) machining of the inner profile, i. e. the profile which in the finished shoe is applied to the insole and (2) machining of the outer profile, which is applied to the inner surface of the sole. The first operation has been described above. The second operation, i. e. the machining of the outer surface of the shank, is effected after the first operation, i. e. after the row machined in the first operation has passed through the machine and has returned to the operator. When the row of pieces has left the machine, the operator tears off the semi-finished pieces and mounts them in the same manner on the next row of clamping means, having the same number of clamping elements. These clamping elements have surfaces corresponding exactly to the concave inner surface of the shanks just machined and the template represents the outer surface of the shanks to be produced. The shanks thus mounted in the fresh row enter the machine once more and are machined on the outer side with the aid of the guide roller rolling on the fresh template. The plates 3 carry alternately clamping surfaces and models 4 for machining the outer and inner surfaces, so that this alternation enables the continuous production of shanks, the drum 1 being utilized to capacity at the same time.

The arm 8 carrying the cutters 7 and the roller 6 is smartly pressed against the drum 1, so that the roller 6 is permanently in contact with the template 4.

The abutments 16 determining the position of the semi-finished products to be machined on the plates 6 may be either mounted directly on the plates 3 together with the clamping positions of the individual shanks, or separate clamping elements may be provided for each piece of work, said elements being inserted into the plates 3 provided with the stops 16.

The machining of the shanks is the result of three movements, the reciprocatory movement of the arm 8 in the axial direction of the shaft 2, the rotary feed movement of the drum 1 for operative engagement and the rotary movement of the milling cutter 7 derived from the motor. The reciprocatory movement of the arm 8 in the direction of the shaft 2 is determined by the path resulting from the movement over all operating positions up to the template and back to the edge of the work.

During each operation the drum moves uninterruptedly into engagement, between the individual operations possibly with such speed that the operator is able to provide all plates passing to the cutters with the inverted shanks to be machined further. A shoe provided with a shank made according to the invention has many advantages as compared to a shoe with one of the shanks hitherto employed. The shanks manufactured according to the present invention can be correctly applied to the sole over the whole surface, it being unnecessary to shape the sole proper at the central and heel portions of the shoe by rolling as hitherto. The actual sole tends to retain its shape longer than hitherto since the more correctly profiled shank supports the insole and the foot in a better manner.

I claim:

1. A machine for making shanks for shoes, said machine comprising a drum shaped body mounted for rotation about its axis and adapted to support on the surface thereof parallel to its axis a set of partly completed shanks, a set of fashioning tools, one for each of the shanks, normally engaging said shanks during rotation of the body and movable to permit fashioning of said shanks, coupling between said tools to render said tools movable only simultaneously, and a guide member connected to said fashioning tools for controlling their movement in co-operation with a model of the shank it is desired to produce.

2. A machine for making shanks for shoes comprising the combination of a drum shaped body mounted for rotation about its axis, retaining means on the surface of said drum parallel to its axis for securing partly completed shanks to said surface, a model of a shank more complete than the said partly completed shanks also mounted on said surface, a set of shank fashioning tools one for each of the partly completed shanks said tools normally engaging said shanks during rotation of the body and being movable to permit rotation thereof and fashioning of said shanks and being coupled together so that movement of any one tool is followed immediately by the others, and a guide member coupled to the said fashioning tools adapted to co-operate with said model for controlling the movement of the tools in their shank fashioning operation, the movement of the guide member being itself controlled by said model.

3. A machine for making shanks for shoes comprising the combination of a cylinder mounted for rotation about its axis, retaining means supported on the surface of said cylinder for securing partly completed shanks to said surface, a number of tools movable to fashion said shanks during rotation of the cylinder, there being one tool to each of a plurality of shanks, a guide member coupled to all of said tools and adapted to control their movement in their shank fashioning operation and means associated with the guide member for supporting for movement with the cylinder a model of a shank in a more nearly finished state than the partly completed shanks supported by the other said retaining means.

4. A machine for making shanks for shoes comprising the combination of a cylinder mounted for rotation about its axis, retaining means supported on the surface of said cylinder and arranged in rows extending longitudinally of the cylinder, for securing partly completed shanks to said surface, a number of tools movable to fashion said shanks during rotation of the cylinder, there being one tool to each shank in a row, a guide member coupled to all of said tools and adapted to control their movement in their shank fashioning operation and means associated with the guide member for supporting for rotation with the cylinder, and corresponding to each row, a model of a shank in a more nearly finished state than the partly completed shanks supported by the other said retaining means.

5. A machine for making shanks for shoes comprising the combination of a cylinder mounted for rotation about its axis, plates removably mounted on the surface of said cylinder, retaining means supported on each of said plates for securing partly completed shanks to said plates, a number of tools movable to fashion said shanks during rotation of the cylinder, there being one tool to each of a plurality of shanks, a guide member coupled to all of said tools and adapted to control their movement in their shank fashioning operation and means associated with the guide member for supporting for movement with the cylinder a model of a shank in a more nearly finished state than the partly completed shanks supported by the other said retaining means.

6. A machine for making shanks for shoes comprising the combination of a cylinder mounted for rotation about its axis, retaining means supported on the surface of said cylinder for securing partly completed shanks to said surface, a number of tools movable to fashion said shanks during rotation of the cylinder, there being one tool to each of a plurality of shanks, a guide member coupled to all of said tools and adapted to control their movement in their shank fashioning operation, means associated with the guide member for supporting for movement with the cylinder a model of a shank form to be produced, and means adapted to drive the cylinder at one speed during the operation of the tools in their fashioning function and to drive the cylinder at a second speed between said operations.

7. A machine for making shanks for shoes comprising the combination of a cylinder mounted for rotation about its axis, retaining means supported on the surface of said cylinder for securing partly completed shanks to said surface, a number of milling cutters movable to fashion said shanks during rotation of the cylinder there being one cutter to each of a plurality of shanks, a guide member coupled to all of said cutters and adapted to control their movement in their operation and means associated with the guide member for supporting for movement with the cylinder a model of a shank in a more nearly finished state than the partly completed shanks supported by the other said retaining means.

8. A machine as claimed in claim 7 in which the milling cutters are mounted on a frame movable along a direction parallel to the axis of said cylinder and pivotally mounted to move towards and away from the cylinder.

9. A machine for making shanks for shoes, comprising the combination of a cylinder mounted for rotation about its axis, retaining means on said cylinder for securing partly completed shanks thereon, said retaining means being arranged in rows extending longitudinally of the cylinder and being adapted in alternate rows to retain shanks, the undersides of which have a first shape, and in the remaining rows to retain shanks the undersides of which have a second shape, a number of tools movable to fashion said shanks during rotation of the cylinder, there being one tool to each shank in a row, a guide member coupled to all of said tools and adapted to control their movement in their shank fashioning operation and means, associated with the guide member, supporting for rotation with the cylinder, and corresponding to each row, a model of a shank in a more nearly finished state than the partly completed shanks supported by the other said retaining means, the models corresponding to the first mentioned alternate rows controlling the guide member to produce the said second shape on the upper faces of the shanks in said rows, and the remaining models controlling the guide member to produce a third shape on the upper faces of the shanks in the remaining rows.

JOHN HOZA.